United States Patent [19]
Daumueller et al.

[11] Patent Number: 5,390,087
[45] Date of Patent: Feb. 14, 1995

[54] HEADLIGHT FOR VEHICLES

[75] Inventors: Hans Daumueller, Bodelshausen; Heinz Ruckwied, Kusterdingen-Wankheim; Hans-Joachim Schmidt, Dusslingen, all of Germany

[73] Assignee: Robert Bosch GmbH, Stuttgart, Germany

[21] Appl. No.: 996,659

[22] Filed: Dec. 24, 1992

[51] Int. Cl.⁶ .............................................. B60Q 1/04
[52] U.S. Cl. ...................................... 362/61; 362/80; 362/282
[58] Field of Search ...................... 362/61, 66, 80, 277, 362/282, 287, 427, 418

[56] References Cited

U.S. PATENT DOCUMENTS

| | | | |
|---|---|---|---|
| 4,807,094 | 2/1989 | Mateos et al. | 362/80 |
| 4,916,583 | 4/1990 | Nagasawa | 362/282 |
| 4,916,586 | 4/1990 | Van Duyn et al. | 362/287 |
| 4,970,628 | 11/1990 | Bergkvist | 362/61 |
| 4,984,136 | 1/1991 | Yamagishi et al. | 362/80 |
| 5,107,407 | 4/1992 | Collot et al. | 362/61 |
| 5,121,303 | 6/1992 | Shirai et al. | 362/61 |
| 5,151,849 | 9/1992 | Nagergast et al. | 362/66 |

*Primary Examiner*—Ira S. Lazarus
*Assistant Examiner*—Y. Quach
*Attorney, Agent, or Firm*—Michael J. Striker

[57] ABSTRACT

A headlight for a vehicle has a housing having a light outlet opening, a transparent light disc covering the light outlet opening, at least one reflector arranged in the housing and provided with a reflecting inner surface so that the reflector being turnable relative to the housing at least in a vertical plane, and a water level for controlling an inclined position of the reflector and visible through a part of the light disc from outside of the headlight. The water level is arranged in the region of the reflecting inner surface of the reflector and visible through a region of the light disc which extends over the light outlet opening of the housing transverse to the direction of light exiting the headlight.

5 Claims, 4 Drawing Sheets

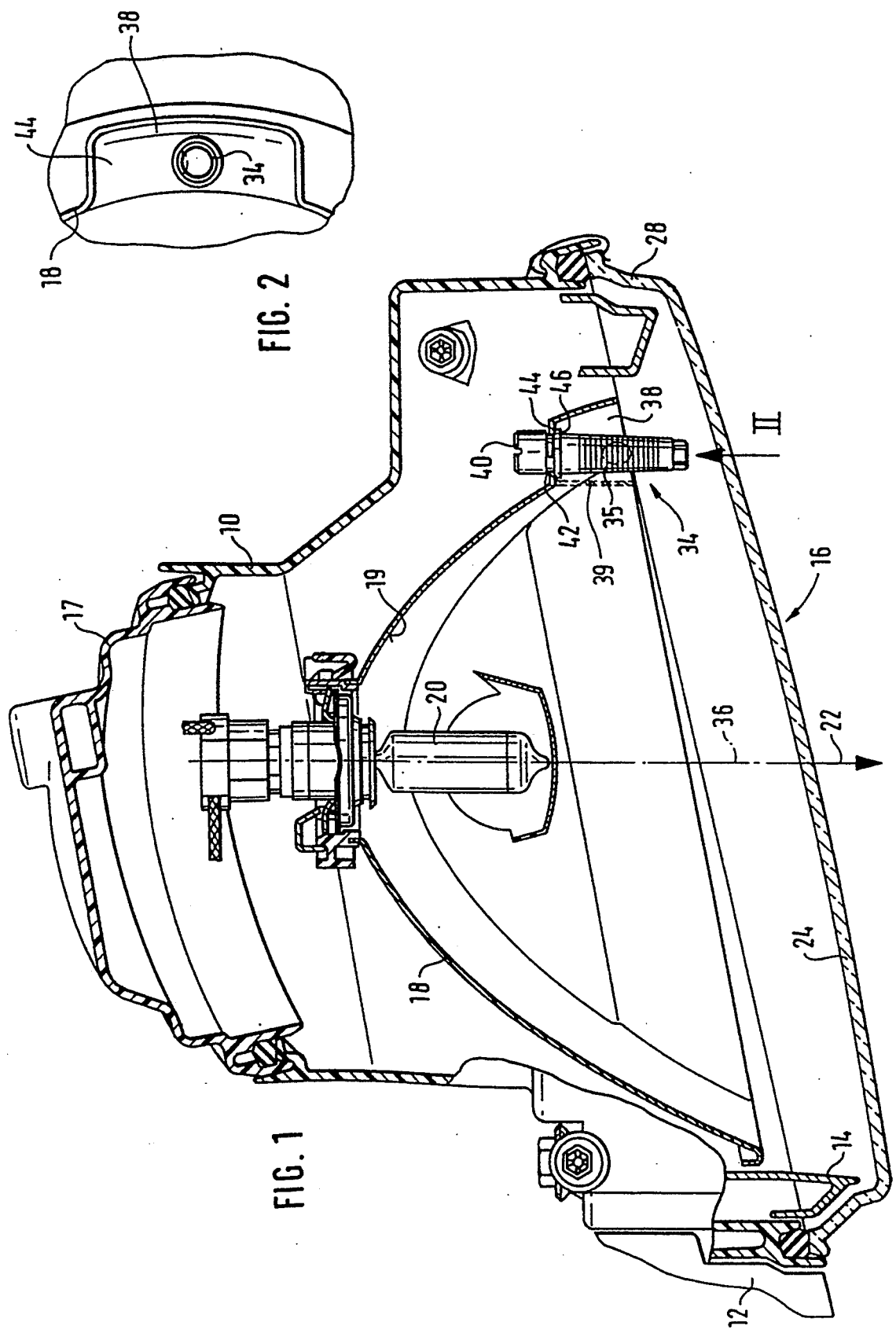

HEADLIGHT FOR VEHICLES

BACKGROUND OF THE INVENTION

The present invention relates to a headlight for motor vehicles.

A headlight for motor vehicles is disclosed in U.S. Pat. No. 4,916,583. In this patent the headlight has a housing with a light outlet opening covered with a light disc. A reflector is turnably arranged in housing and provided with a water (bubble) level for controlling its angle of inclination. The water level is arranged on the outer surface of the reflector which faces away, of the reflecting inner surface of the reflector and visible through the light disc from outside of the headlight. The light disc has a main region extending transverse to the outer opening of the headlight and requires an edge region which surrounds the main region and extends substantially parallel to the light outlet opening, so that the water level can be seen through the upwardly located part of the edge region of the light disc. The water level, depending on the mounting condition of the headlight, for example when a chassis part of the motor vehicle is arranged on top of it can be recognizable only with certain difficulties. Therefore, the angle of inclination of the reflector can be checked only with a certain inaccuracy.

SUMMARY OF THE INVENTION

Accordingly, it is an object of the present invention to provide a headlight for motor vehicles which avoids the disadvantages of the prior art.

In keeping with these objects and with others which will become apparent hereinafter, one feature of the present invention resides, briefly state, in a headlight for motor vehicles, in which the water level is arranged in the region of a reflecting inner surface of the reflector and is visible through a region of the light disc which extends over the light outlet opening of the housing transverse to the direction of the light exiting the reflector.

When the headlight is designed in accordance with the present invention, it avoids the disadvantages of the prior art. In particular the water level is well visible through the main region of the light disc, which extends transverse to the light outlet opening. Thereby, the angle of inclination of the reflector can be checked reliably and fast.

In accordance with another feature of the present invention, the reflective inner surface of the reflector has a depression in which the water level is arranged. In this construction the water level is distorted as little as possible by the light reflection at the reflector.

In accordance with another feature of the present invention, the water level is arranged in a lower edge region of the reflector. The reflector can have an upper region for producing a low beam and a lower region for producing another high or fog beam, and the water level is located in the region of the reflecting inner surface of the lower reflector region.

When the headlight is designed in accordance with this construction, the water level on the high beam reflector is not affected by the light reflection of the low beam reflector, and such an affection by the high beam reflector is less critical.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a headlight for a motor vehicle in horizontal cross-section, in accordance with the first embodiment of the present invention;

FIG. 2 is a partial view of the headlight as seen in direction of the arrow II in FIG. 1;

DESCRIPTION OF THE PREFERRED EMBODIMENTS

Figure 3:
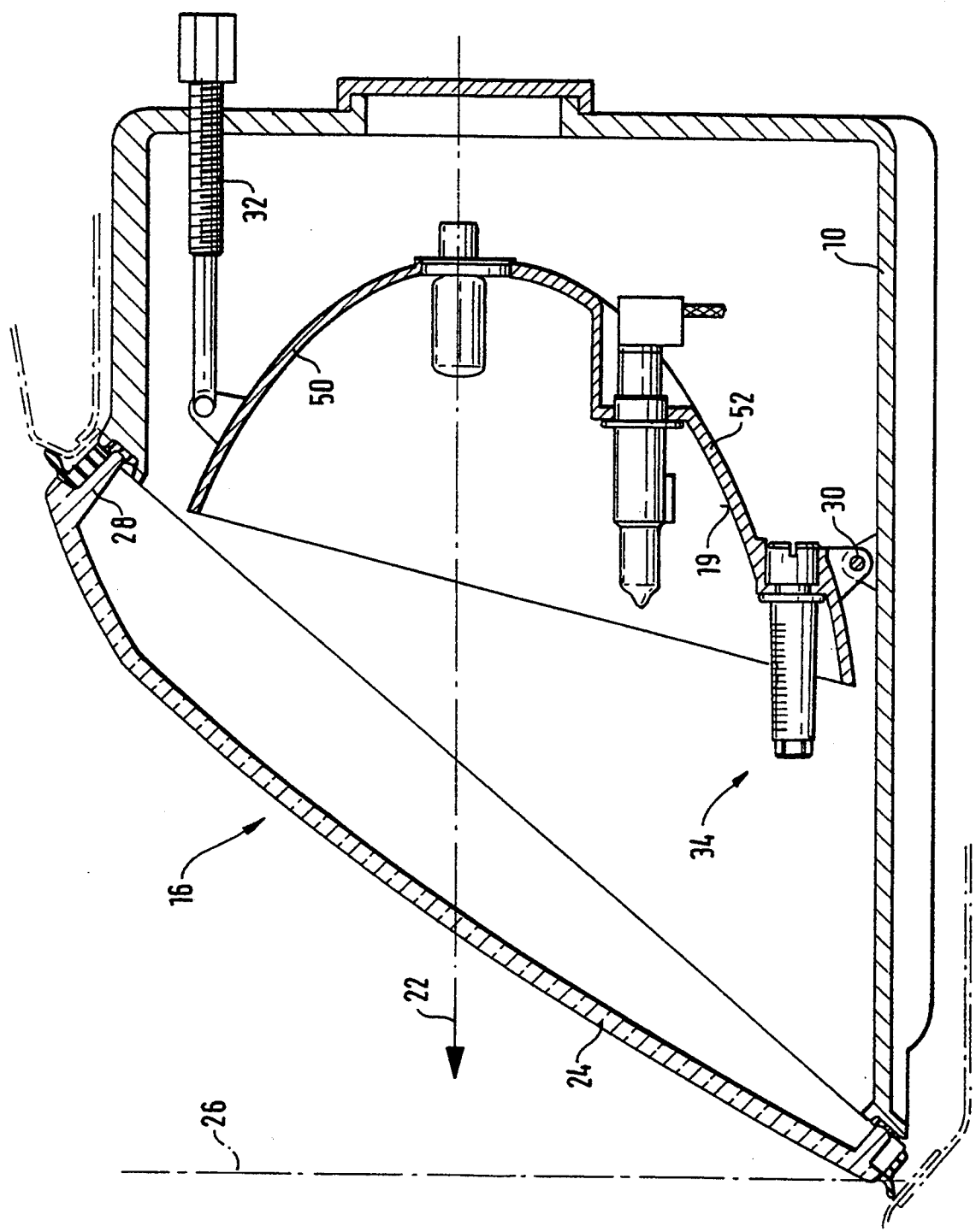
FIG. 3 is a view showing a headlight of FIG. 1 in accordance with a different embodiment in a vertical cross-section.

A headlight for vehicles, particularly motor vehicles, shown in FIGS. 1–5, has a housing which is identified with reference numeral 10. The housing can be composed of synthetic plastic material and mounted on a chassis 12 of the vehicle. The housing 10 at its front side is provided with a light outlet opening 14 which is closed by a light-permeable light disc 16. An opening is provided also at the rear side of the housing 10 and covered with a cap 17.

In the first embodiment of the invention shown in FIGS. 1 and 2, a reflector 18 is arranged in the housing 10 and connected with the housing by several bearing points. A light source 20 is inserted in the reflector 18, and the reflector 18 is provided with a reflecting coating on its inner surface 19. The light which is emitted by the light source 20 is reflected by the coating to the light outlet opening 14 of the housing 10 and then exits the headlight in direction of the arrow 22 in FIG. 1.

The light disc 16 has a main region 24 which extends transverse to the light outlet opening 14 so that the light reflected by a reflector 18 passes through the main region. It can be provided with a plurality of optical elements, for example, lenses and/or prisms which disperse and deviate the passing light. The main region 24 of the light disc 16 can extend perpendicularly to the light outlet opening 14 or, as shown in FIG. 3, can be inclined with its upper edge opposite to the light outlet direction 22 with respect to a vertical line 26. The light disc 16 also has an edge region 28 which surrounds the main region 24. The edge region 28 is connected with the front edge of the housing 10, for example glued to it.

The reflector 18 is turnable relative to the housing 10 about a horizontally extending axis 30 shown in FIG. 3. For this purpose, adjusting elements 32 engage the reflector 18 eccentrically relative to the axis 30. By actuating the adjusting elements, the reflector 18 can be axially moved in the region of its deviation and turned about the axis 30. The reflector 18 can also be turnable about vertically extending axis 30 for adjusting its orientation in the horizontal direction.

A water level 34 is arranged in a lateral region of the reflector 18 on the inner surface 19 provided with a reflecting coating. The water level 34 has a transparent glass or synthetic plastic tube 35 filled with a liquid in which an air bubble is located. The tube 35 extends substantially parallel to the optical axis 36 of the reflector 18 in the light outlet direction 22. A scale is printed on the tube 35, and the position of the air bubble can be read with respect to the scale to indicate a value of inclination of the reflector 18. The reflector 18 has a lateral depression or niche 38 on which the water level 34 is arranged. The depression 38 is a part of the reflecting inner surface 19 of the reflector 18. The depression 38 can be delimited on its inner side by a wall 39 of the reflector 18, which extends in the light outlet direction 22. The wall 39 is shown in FIG. 1 in dotted lines. The rigidity of the reflector 18 can be improved by the wall 39. Also when the wall 39 is provided the depression 38 is a part of the reflecting inner surface 19 of the reflector 18. The mounting of the water level 34 on the reflector 18 can be performed in different ways. In the embodiment shown in FIGS. 1 and 2 the water level 34 has a cylindrical portion 40 extending opposite to the light outlet direction 22. The portion 40 extends into an opening 42 provided in a wall 44 of the reflector 18. The wall extends transverse to the optical axis 36 and limits the depression 34 against the light outlet opening direction 22.

The end position of the water level 34 is determined by the abutment of a radial flange 46 formed on it, against the wall 44. The height of the depression 38 in the vertical direction as shown in FIG. 2 is greater than the water level 34. Therefore, the water level 34 is visible through the main region 24 of the light disc 16 from outside of the headlight, from above inclinedly. The water level 34, in deviation from the above description, can be also arranged in another region of the reflector 18, for example in a lower region. Preferably, the water level 34 is arranged in a reflector region which does not contribute substantially to the production of the low beam.

In the modification shown in FIG. 3, the reflector has an upper region 50 which serves for producing a low beam and has a lower region 52 which serves for producing a high beam or a fog beam. The reflector regions 50 and 52 can each have its own light source 20 or a joint light source. The water level 34 is arranged in this embodiment in the region of the reflecting inner surface 19 of the lower reflector region 52. The mounting of the water level 34 and the construction of the lower reflector region 52 with a depression can be performed as shown in FIG. 1. In this arrangement the water level 34 in the lower reflector region 52 does not affect the production of the low beam for maintaining the regulatorily prescribed light intensity distribution.

Figure 4:
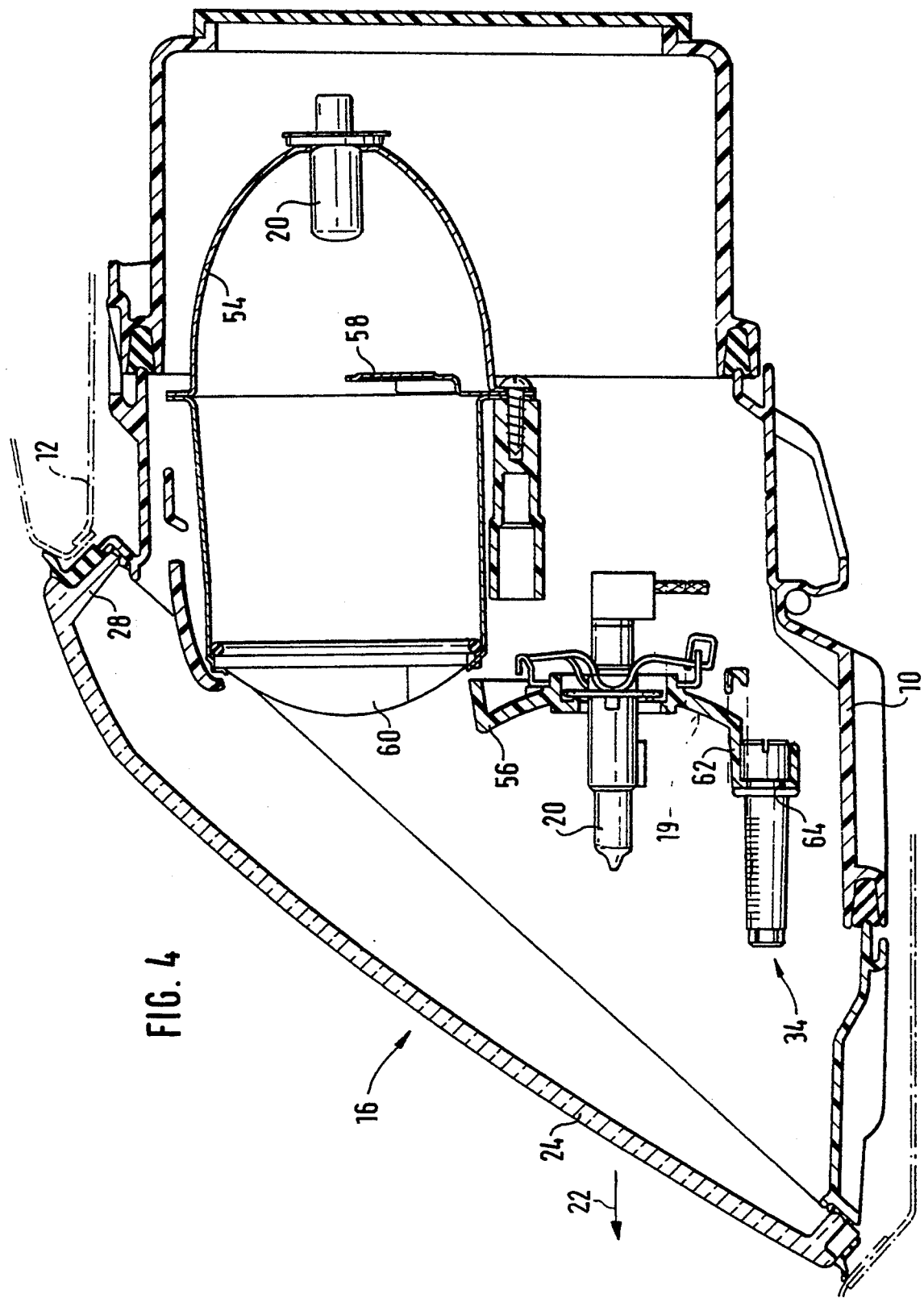
FIG. 4 is a view showing a headlight in a vertical cross-section, in accordance with a second embodiment of the invention.
Figure 5:
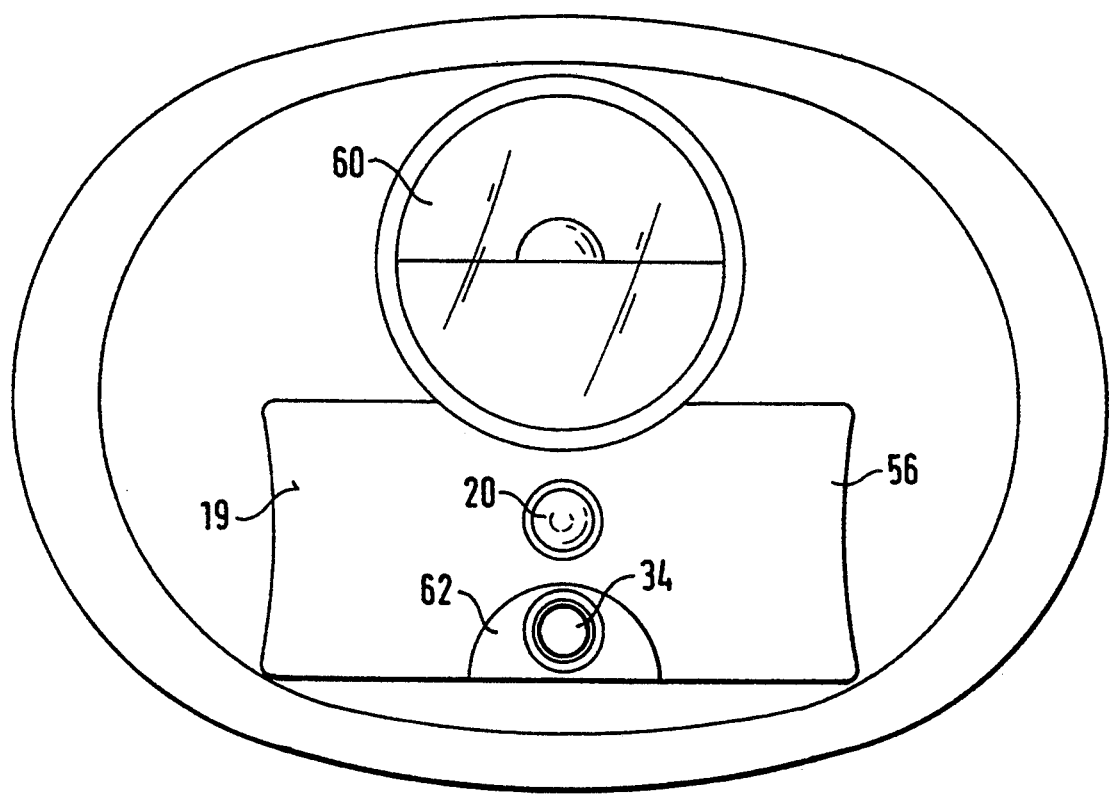
FIG. 5 is a view showing a headlight of FIG. 4, partially sectioned, on a front view.

In the second embodiment shown in FIGS. 4 and 5 the headlight has two reflectors 54 and 56. One reflector 54 is used for producing a low beam, while the other reflector 56 is used for producing a high beam. A light source 20 is arranged in each of the reflectors 54, 56. The high beam reflector 56 is arranged under the low beam reflector 54. Both reflectors 54 and 56 are fixedly connected with one another and jointly turnable in the housing 10 about a horizontal axis 30. For simultaneously adjusting a correct orientation of both reflectors 54 and 56, they are adjusted relative to one another before their connection and then connected in this position. The connection of the reflectors 54 and 56 can be performed, for example, by several not shown screws.

The low beam reflector 54 can be formed, for example, as an ellipsoid. A diaphragm 58 is arranged in the region of its front edge and a lens 60 is spaced from the diaphragm 58 in the light outlet direction 22. The diaphragm 58 forms a bright/dark limit of the low beam exiting the headlight and formed by the lens 60. The high beam reflector 56 has any shape which is suitable for producing the high beam. The light disc 16 extends over both reflectors 54 and 56 and can be formed as a clear disc or provided with optical elements. The light disc 16 is formed as in the first embodiment. It has a main region 24 and an edge region 28 and is inclined with its upper edge back against the light outlet direction 22 with respect to a vertical line 26.

A water level 34 is arranged on the high beam reflector 56 and formed as in the first embodiment. The high beam reflector 56 has a console 62 provided in the middle of a lower edge region and extending in the light outlet direction 22. An opening 64 is provided in the console 62, and the water level 34 has a cylindrical portion 40 inserted in the opening 64. As can be seen from FIGS. 4 and 5, the console 62 is surrounded laterally and from above by a reflecting inner surface 19 of the high beam reflector 56 and can be coated in a reflecting fashion. The console 62 can be also completely surrounded by the reflecting inner surface 19 of the reflector 56. The water level 34 is visible from above the head light through the main region 24 of the light disc 16 from above inclinedly.

The construction of the light reflector with the console 62 can be provided also in the embodiment of FIGS. 1-3.

It will be understood that each of the elements described above, or two or more together, may also find a useful application in other types of constructions differing from the types described above.

While the invention has been illustrated and described as embodied in a headlight for a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight for a vehicle, comprising a housing having a light outlet opening; a transparent light disc covering said light outlet opening; at least one reflector arranged in said housing and provided with a curved reflecting inner surface so that the reflector being turnable relative to said housing at least in a vertical plane; and a water level for determining an inclined position of said reflector and visible through a part of said light disc from outside of the headlight, said water level being arranged in a region of said curved reflecting inner surface of the reflector and visible through a region of said light disc which extends over said light outlet opening of said housing transverse to the direction of light exiting the headlight, said reflector having an upper region for producing a low beam and a lower region for producing one of a high beam and a fog beam, said lower region of said reflector being provided with a console which extends in a direction of light exiting the headlight, said console being surrounded at least laterally and from above by said curved reflecting inner surface of said reflector, said water level being arranged on said console and protruding from the console in the direction of light exiting the headlight.

2. A headlight as defined in claim 1, wherein said reflecting inner surface of said reflector has a depression, said water level being arranged in said depression.

3. A headlight as defined in claim 1, wherein said reflector has a lateral region, said water level being arranged in said lateral region of said reflector.

4. A headlight as defined in claim 1, wherein said reflector has a lower edge region, said water level being arranged in said lower edge region of said reflector.

5. A headlight for a vehicle, comprising a housing having a light outlet opening; a transparent light disc covering said light outlet opening; at least one reflector arranged in said housing and provided with a curved reflecting inner surface so that the reflector being turnable relative to said housing at least in a vertical plane; a water level for determining an inclined position of said reflector and visible through a part of said light disc from outside of the headlight, said water level being arranged in a region of said curved reflecting inner surface of the reflector and visible through a region of said light disc which extends over said light outlet opening of said housing transverse to the direction of light exiting the headlight; a second reflector arranged in said housing, one of said reflectors being formed for producing a low beam while another of said reflectors being formed for producing a high beam, said reflectors being fixedly connected with one another and jointly turnable, said reflector for producing a high beam being provided with a console which extends in a direction of light exiting the headlight, said console being surrounded at least laterally and from above by said curved reflecting inner surface of said reflector for producing a high beam, said water level being arranged on said console and protruding from the console in the direction of light exiting the headlight.

* * * * *